Aug. 10, 1965   G. A. CHARLAND   3,199,672
MULTIPLE TEST UNIT TESTER AND METHOD
Filed July 20, 1962
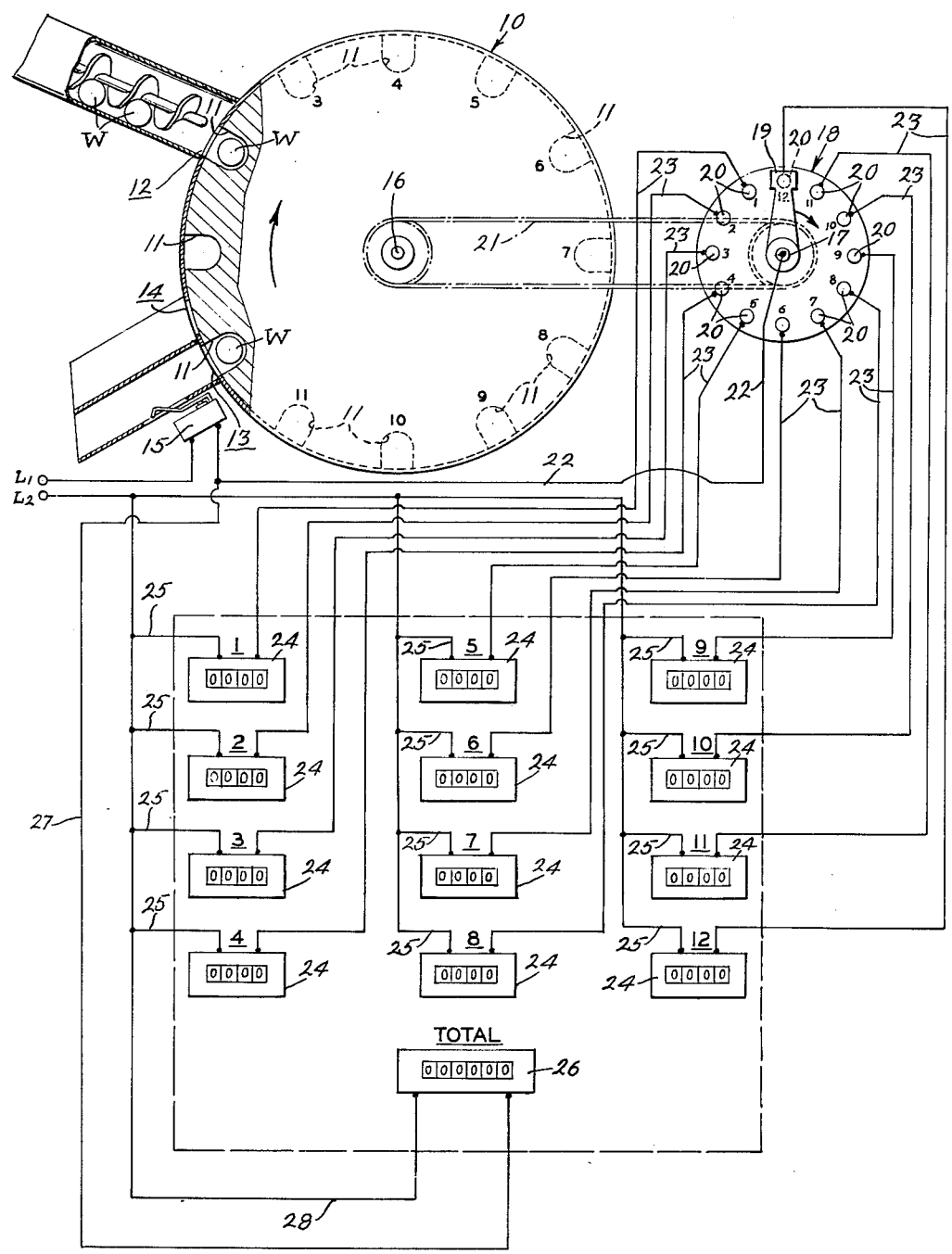
INVENTOR:
GEORGE A. CHARLAND
BY
Howson & Howson
ATTYS.

United States Patent Office 3,199,672
Patented Aug. 10, 1965

3,199,672
MULTIPLE TEST UNIT TESTER AND METHOD
George A. Charland, Conshohocken, Pa., assignor to Campbell Soup Company, Camden, N.J., a corporation of New Jersey
Filed July 20, 1962, Ser. No. 211,332
6 Claims. (Cl. 209—72)

This invention relates to a multiple test unit tester and has for an object the provision of improvements in this art.

One example of the practical use of the invention is for rotary multiple pocket or unit can testers in which a can is inserted in each pocket as it comes to a charging position; in which each can in each pocket is tested, as by air pressure for leakage or by other test procedure; and in which a can is discharged at a reject position if it does not meet the test requirements or is discharged at an acceptance station if it does meet the test requirements. There may be a great number of test units or pockets in the series—possibly forty, fifty, a hundred or more—and each unit may have complex fittings or connections which are subject to disarrangement. When such fittings or connections are disarranged the articles may be registered for rejection and rejected when, in fact, they are acceptable and would pass as acceptable except for the faulty condition of the test unit or pocket.

It is therefore, a particular object of the present invention to provide means and method for testing in which a record is made of the number of actions of each test unit—rejections or acceptances, whichever is selected—and also a record of the total number of like actions of all test units. With these records it is possible to compare the actions of all test units with each other and with the total and when it is found that a test unit is far from the average of all other units it can safely be assumed that there is some disarrangement at that unit and that proper repair or adjustment should be made.

Another object is to provide such means and method which are simple and reliable.

The above and other objects as well as various features of novelty and advantages will be apparent from the following description of an exemplary embodiment of the invention, reference being made to the accompanying drawings, in which:

The single figure is a schematic and wiring diagram of a rotary can test unit tester embodying the invention.

As shown in the drawing, a can tester machine including a wheel or conveyor 10 is provided with a plurality of can testing units in the present instance, compartments or pockets 11 which traverse a predetermined path, in the present instance a circular path and during the course of movement along said path successively pass a loading station 12 where a can W is introduced, then proceed around the test path where desired tests are made, and finally pass first and second discharge stations, in the present instance, a reject station 13 where a can is discharged if it fails the test and to an acceptance station 14 where the can is discharged if it passes the test. Each of the cans W is tested in the test unit, for example, for leakage and each test unit discharges the can W therein when it registers with the reject or acceptance stations depending on whether the can fails or passes the test. Only a few test units are shown on the wheel conveyor but there may be a great number of such units. It will also be understood that the test conveyor may have forms other than a wheel.

At the station where actions are to be counted, here at the reject station 13, there is provided a micro switch 15 which is closed as each article passes down the chute.

In accordance with the present invention, means is provided for counting the number of cans discharged at either said reject or acceptance station for each of said test units and also for counting the total number of cans discharged at said station. To this end, in operative connection with the shaft 16 of the drum there is the shaft 17 of a commutator 18 having a contact arm 19 and a plurality of contacts 20 corresponding in number and relative position to the test units of the wheel. A positive drive is provided between the drum shaft 16 and the commutator shaft 17, here a sprocket chain 21 geared to sprockets on the shafts, to keep the shafts in synchronism so that each contact 20 will always represent the same test unit 11. Here the test units and commutator contacts are numbered from 1 to 12 for identification.

The arm 17 represents the reject station and the contacts 20 represent the test units on the conveyor, the relative movements merely being reversed, although it would be possible to rotate the commutator plate instead of the arm, and by a connection or lead conductor 22 from the switch 15 to the arm 19 and by connections or lead conductors 23 from the contacts 20 to a plurality of unit counters or indicia registers or recorders 24 it is possible to register each rejection at each station. Return leads 25 connect the counters to a supply line L2, the other supply line L1 going to the switch 15. A total counter or recorder 26 is connected by leads 27 and 28 with conductor 22 and line L2, respectively, so that an action is registered on the totals counter or recorder each time there is an action registered on any one of the units counters or recorders.

By this arrangement whenever the switch 15 registers the passing of a rejected article the counters or recorders 24 will register the action or rejection for the particular test unit from which it was rejected and the counter 26 will register the total of all rejections.

The commutator, counters and all wiring except the connection to the switch 15 may be formed as a single portable unit which can be mechanically connected to a test drum drive shaft of any desired testing machine, the sprocket drive 21 being representative of one form of such drive connection. Then when the commutator is synchronized with the movement of the test units the device will make a check on the testing machine to which it is connected.

It is thus seen that the invention provides a simple and convenient testing device for multiple unit testing machines.

While one embodiment of the invention has been described for purposes of illustration it is to be understood that there may be various embodiments and modifications within the scope of the invention.

I claim:

1. For article handling apparatus having a plurality of compartments for articles wherein articles are supplied to the compartments at a loading station and selectively discharged from each of the compartments at either the first or second discharge station, means for counting the number of articles discharged from each of the compartments at one of the discharge stations comprising a commutator with a plurality of contacts corresponding in number to the number of compartments and an arm movable relative to said contacts which registers with a given contact when a given compartment is aligned with said one discharge station, sensing means for sensing when an article is received at said one discharge station and for transmitting a signal to said commutator, a recording device for each compartment operatively connected to each of the contacts of said commutator operable to receive said signal from said sensing means whereby the number of articles discharged at said one discharge station from each of said compartments may be recorded.

2. Apparatus as claimed in claim 1 which additionally includes a totals recording device connected to said sensing means and individual recording devices for registering the total number of articles discharged at said one discharge station.

3. Apparatus as claimed in claim 1 wherein said sensing means is a switch.

4. In combination, article handling apparatus including a plurality of compartments for articles mounted for movement along a predetermined path, feed means along said path for supplying articles one at a time to said compartments, first and second discharge stations along said path through which articles are selectively discharged, a counter for registering the number of articles discharged at one of said discharge stations from each of said compartments comprising a commutator with a plurality of contacts corresponding in number to the number of compartments and a contact arm traversing said contacts and mounted for relative movement thereto in synchronization with the rate of movement of said compartments along said path, said arm registering with a given contact when its respective compartment is registered with said one discharge station, sensing means for sensing when an article is received at said one discharge station and for transmitting a signal to said commutator, a recording device for each compartment operatively connected to said commutator for registering separately the articles discharged at said one discharge station from each of said compartments.

5. The combination as claimed in claim 4 including a totals recording device connected to said commutator for registering the total number of articles discharged at said one discharge station for all of said compartments.

6. In combination, a test apparatus including a plurality of test units for testing articles mounted for movement along a predetermined path, feed means along said path for supplying articles one at a time to said test units, first and second discharge stations along said path through which articles are discharged respectively depending on whether they are passed or rejected by said test unit, a counter for registering the number of articles discharged at one of said stations from each of said test units comprising a commutator with a plurality of contacts corresponding in number to the number of test units and a contact arm traversing said contacts and mounted for relative movement thereto in synchronization with the rate of movement of said test units along said path, said arm registering with a given contact when its respective test unit is registered with said one station, sensing means for sensing when an article is received at said one station and for transmitting a signal to said commutator, a recording device for each test unit operatively connected to said commutator for registering separately the articles discharge at said station from each of said test units.

References Cited by the Examiner

UNITED STATES PATENTS

| 1,083,840 | 1/14 | Kiparski. |
| 2,542,090 | 2/51 | Lorenz. |
| 2,609,911 | 9/52 | Davis _____ 198—40 XR |
| 2,617,528 | 11/52 | Moore. |
| 2,702,380 | 2/55 | Brustman. |

FOREIGN PATENTS

| 751,931 | 7/56 | Great Britain. |

ROBERT B. REEVES, *Acting Primary Examiner.*